US00RE49053E

(19) United States
(12) Reissued Patent
Chen et al.

(10) Patent Number: US RE49,053 E
(45) Date of Reissued Patent: *Apr. 26, 2022

(54) SYSTEM AND METHOD FOR AN ADAPTIVE TCP SYN COOKIE WITH TIME VALIDATION

(71) Applicant: A10 Networks, Inc., San Jose, CA (US)

(72) Inventors: Lee Chen, Saratoga, CA (US); Ronald Wai Lun Szeto, San Francisco, CA (US); Shih-Tsung Hwang, San Jose, CA (US)

(73) Assignee: A10 Networks, Inc., San Jose, CA (US)

( * ) Notice: This patent is subject to a terminal disclaimer.

(21) Appl. No.: 16/235,249

(22) Filed: Dec. 28, 2018

Related U.S. Patent Documents

Reissue of:
(64) Patent No.: 7,675,854
Issued: Mar. 9, 2010
Appl. No.: 11/358,245
Filed: Feb. 21, 2006

U.S. Applications:
(63) Continuation of application No. 14/151,803, filed on Jan. 9, 2014, now Pat. No. Re. 47,296, which is a continuation of application No. 13/413,191, filed on Mar. 6, 2012, now Pat. No. Re. 44,701, which is an application for the reissue of Pat. No. 7,675,854.

(51) Int. Cl.
*G01R 31/08* (2020.01)
*H04L 47/10* (2022.01)
*H04L 29/06* (2006.01)

(52) U.S. Cl.
CPC ..... *H04L 47/10* (2013.01); *H04L 63/1458* (2013.01)

(58) Field of Classification Search
CPC ..... H04L 47/10; H04L 63/1458
USPC ..... 370/230.1; 709/227, 228; 726/22, 3, 6
See application file for complete search history.

(56) References Cited

U.S. PATENT DOCUMENTS 5,958,053 A * 9/1999 Denker ..... 726/1
6,047,268 A * 4/2000 Bartoli et al. ..... 713/153
6,321,338 B1 * 11/2001 Porras et al. ..... 709/224
6,772,334 B1 * 8/2004 Glawitsch ..... 726/22
6,779,033 B1 * 8/2004 Watson et al. ..... H04L 29/06 709/227
7,058,718 B2 * 6/2006 Fontes ..... H04L 63/12 370/254
7,254,133 B2 8/2007 Govindarajan et al.
7,269,850 B2 * 9/2007 Govindarajan ..... H04L 63/1408 726/22
7,301,899 B2 * 11/2007 Goldstone ..... 370/230

(Continued)

*Primary Examiner* — David E England
(74) *Attorney, Agent, or Firm* — Keith Kline; The Kline Law Firm PC

(57) ABSTRACT

Provided is a method and system for TCP SYN cookie validation. The method includes receiving a session SYN packet by a TCP session setup module of a host server, generating a transition cookie including a time value representing the actual time, sending a session SYN/ACK packet, including the transition cookie, in response to the received session SYN packet, receiving a session ACK packet, and determining whether a candidate transition cookie in the received session ACK packet comprises a time value representing a time within a predetermined time interval from the time the session ACK packet is received.

21 Claims, 10 Drawing Sheets

(56) References Cited

U.S. PATENT DOCUMENTS

| | | | | |
|---|---|---|---|---|
| 7,370,353 | B2 * | 5/2008 | Yang | 726/11 |
| 7,391,725 | B2 * | 6/2008 | Huitema et al. | 370/230.1 |
| 7,430,755 | B1 * | 9/2008 | Hughes et al. | 726/3 |
| 7,506,360 | B1 * | 3/2009 | Wilkinson et al. | 709/223 |
| 7,512,980 | B2 * | 3/2009 | Copeland et al. | 726/22 |
| 7,552,323 | B2 * | 6/2009 | Shay | 713/160 |
| 7,610,622 | B2 | 10/2009 | Touitou et al. | |
| 7,675,854 | B2 * | 3/2010 | Chen | H04L 63/1458 370/230.1 |
| 7,733,866 | B2 | 6/2010 | Mishra et al. | |
| 7,826,487 | B1 * | 11/2010 | Mukerji | H04L 67/2828 370/477 |
| 7,979,694 | B2 | 7/2011 | Touitou et al. | |
| 8,559,437 | B2 | 10/2013 | Mishra et al. | |
| RE44,701 | E * | 1/2014 | Chen | H04L 63/1458 370/230.1 |
| RE47,296 | E * | 3/2019 | Chen | H04L 63/1458 |
| 2001/0042200 | A1 | 11/2001 | Lamberton et al. | |
| 2002/0103916 | A1 * | 8/2002 | Chen et al. | 709/229 |
| 2003/0135625 | A1 * | 7/2003 | Fontes et al. | H04L 63/12 709/228 |
| 2005/0240989 | A1 * | 10/2005 | Kim et al. | 726/11 |
| 2006/0023721 | A1 * | 2/2006 | Miyake et al. | 370/395.2 |
| 2006/0069804 | A1 * | 3/2006 | Miyake et al. | 709/237 |
| 2006/0230129 | A1 | 10/2006 | Swami et al. | |
| 2006/0280121 | A1 * | 12/2006 | Matoba | 370/235 |
| 2007/0019543 | A1 * | 1/2007 | Wei et al. | 370/229 |
| 2012/0240185 | A1 * | 9/2012 | Kapoor | H04L 63/20 726/1 |

* cited by examiner

SYSTEM AND METHOD FOR AN ADAPTIVE TCP SYN COOKIE WITH TIME VALIDATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a continuation reissue application of U.S. Pat. No. 7,675,854 and claims benefit under U.S.C. 120 as a continuation of application Ser. No. 14/151,803, filed on Jan. 9, 2014, which is a continuation reissue application of U.S. Pat. No. 7,675,854 and claims benefit under 35 U.S.C. 120 as a continuation of application Ser. No. 13/413,191 filed on Mar. 6, 2012, which is an application for reissue of U.S. Pat. No. 7,675,854, originally issued on Mar. 9, 2010.*

BACKGROUND OF THE INVENTION

When a TCP (Transmission Control Protocol) connection starts, a destination host receives a SYN (synchronize/start) packet from a source host and sends back a SYN ACK (synchronize acknowledge). The destination host normally then waits to receiver an ACK (acknowledge) of the SYN ACK before the connection is established. This is referred to as the TCP "three-way handshake."

While waiting for the ACK to the SYN ACK, a connection queue of finite size on the destination host keeps track of connections waiting to be completed. This queue typically empties quickly since the ACK is expected to arrive a few milliseconds after the SYN ACK is sent.

A TCP SYN flood attack is a well known denial of service attack that exploits the TCP three-way handshake design by having an attacking source host generate TCP SYN packets with random source addresses toward a victim host. The victim destination host sends a SYN ACK back to the random source address and adds an entry to the connection queue, or otherwise allocates server resources. Since the SYN ACK is destined for an incorrect or non-existent host, the last part of the "three-way handshake" is never completed and the entry remains in the connection queue until a timer expires, typically, for example, for about one minute. By generating phony TCP SYN packets from random IP addresses at a rapid rate, it is possible to fill up the connection queue and deny TCP services (such as e-mail, file transfer, or WWW) to legitimate users. In most instances, there is no easy way to trace the originator of the attack because the IP address of the source is forged. The external manifestations of the problem may include inability to get e-mail, inability to accept connections to WWW or FTP services, or a large number of TCP connections on your host in the state SYN_RCVD.

A malicious client sending high volume of TCP SYN packets without sending the subsequent ACK packets can deplete server resources and severely impact the server's ability to serve its legitimate clients.

Newer operating systems or platforms implement various solutions to minimize the impact of TCP SYN flood attacks. The solutions include better resource management, and the use of a "SYN cookie".

In an exemplary solution, instead of allocating server resource at the time of receiving a TCP SYN packet, the server sends back a SYN/ACK packet with a specially constructed sequence number known as a SYN cookie. When the server then receives an ACK packet in response to the SYN/ACK packet, the server recovers a SYN cookie from the ACK packet, and validates the recovered SYN cookie before further allocating server resources.

The effectiveness of a solution using a SYN cookie depends on the method with which the SYN cookie is constructed. However, existing solutions using a SYN cookie typically employ a hash function to construct the SYN cookie, which can lead to a high percentage of false validations of the SYN cookie, resulting in less than satisfactory protection again TCP SYN flood attack.

Therefore, there is a need for a better system and method for constructing and validating SYN cookies.

SUMMARY OF THE INVENTION

An aspect of the present invention provides a system for TCP SYN cookie validation. The system includes a host server including a processor and memory. The processor is configured for receiving a session SYN packet, generating a transition cookie, the transition cookie comprising a time value representing the actual time, sending a session SYN/ACK packet, including the transition cookie, in response to the received session SYN packet, receiving a session ACK packet, and determining whether a candidate transition cookie in the received session ACK packet comprises a time value representing a time within a predetermined time interval from the time the session ACK packet is received.

One aspect of the invention includes the system above in which the processor is further configured for regarding the received session ACK packet as valid if the candidate transition cookie in the received session ACK packet comprises a time value representing a time within a predetermined time interval from the time the session ACK packet is received.

In another aspect of the invention, the predetermined time interval is in the range of one to six seconds.

In one aspect of the invention, the predetermined time interval is three seconds.

In another aspect of the invention, the step of generating the transition cookie includes the use of data obtained from the session SYN packet.

In one aspect of the invention, the data obtained from the session SYN packet comprises the source IP address of an IP header associated with the session SYN packet.

In another aspect of the invention, the data obtained from the session SYN packet comprises the sequence number of a TCP header associated with the session SYN packet.

In another aspect of the invention, the data obtained from the session SYN packet comprises a source port associated with the session SYN packet.

In another aspect of the invention, the data obtained from the session SYN packet comprises a destination port associated with the session SYN packet.

Another aspect of the present invention provides a method for TCP SYN cookie validation. The method includes receiving a session SYN packet by a TCP session setup module, generating a transition cookie by the TCP session setup module, the transition cookie comprising a time value representing the actual time, sending a session SYN/ACK packet, including the transition cookie, in response to the received session SYN packet, receiving a session ACK packet, and determining whether a candidate transition cookie in the received session ACK packet comprises a time value representing a time within a predetermined time interval from the time the session ACK packet is received.

In an aspect of the invention, the method further includes indicating the received session ACK packet comprises a valid candidate transition cookie if the time value of the candidate transition cookie is within a predetermined time interval of the time the session ACK packet is received.

In another aspect of the invention, the step of generating the transition cookie includes the use of data obtained from the session SYN packet.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

Transmission Control Protocol ("TCP") is one of the main protocols in TCP/IP networks. Whereas the Internet Protocol ("IP") deals only with packets, TCP enables two hosts to establish a connection and exchange streams of data. TCP guarantees delivery of data and also guarantees that packets will be delivered in the same order in which they were sent.

The terms "host server" and "client server" referred to in the descriptions of various embodiments of the invention herein described are intended to generally describe a typical system arrangement in which the embodiments operate. The "host server" generally refers to any computer system interconnected to a TCP/IP network, including but not limited to the Internet, the computer system comprising at a minimum a processor, computer memory, and computer software. The computer system is configured to allow the host server to participate in TCP protocol communications over its connected TCP/IP network. Although the "host server" may be a single personal computer having its own IP address and in communication with the TCP/IP network, it may also be a multi-processor server or server bank. The "client server" is similar to the "host server", although it is understood that the "client server" may, in fact, be a single personal computer attached to the TCP/IP network. The only difference between the client and the host server for the purposes of the present invention is that the host server receives the SYN from the client server, sends a SYN ACK to the client server, and waits for the ACK from the client server.

Figure 1:
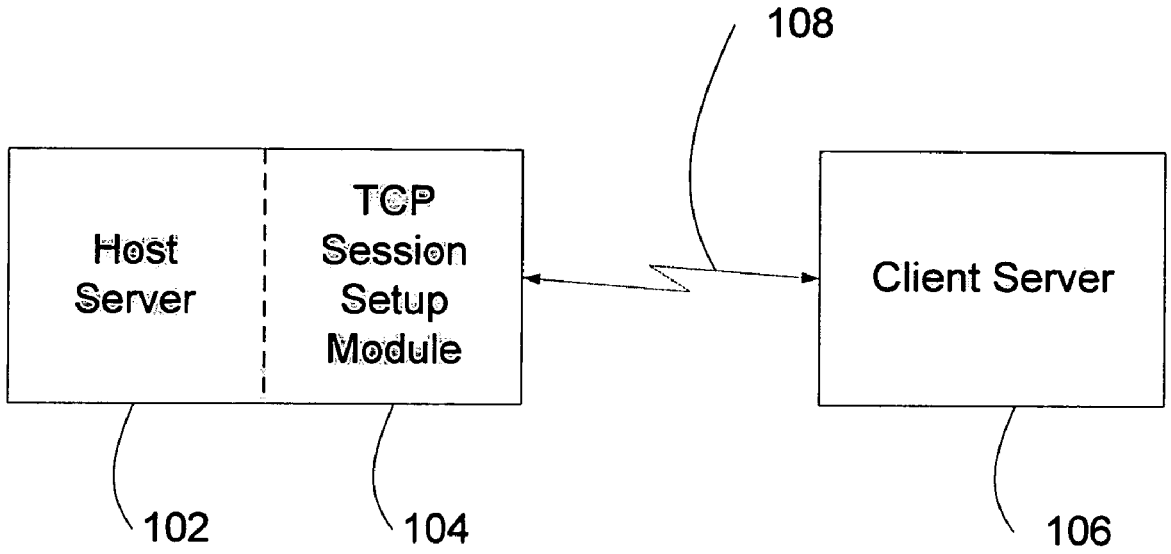
FIG. 1 is a schematic diagram illustrating a host server including a TCP session setup module and a client server, in accordance with an embodiment of the present invention.

FIG. 1 is a schematic diagram illustrating an embodiment of the present invention. A host server 102 may include a TCP session module 104. The TCP session setup module 104 can engage in a TCP handshake 108, such as described above, with a client server 106. In an embodiment, the TCP session setup module 104 is a software component of the host server 102. In one embodiment, the TCP session setup module 104 is implemented in an Application Specific Integrated Circuit ("ASIC") or a Field Programmable Gate Array ("FPGA"). It is the TCP session setup module that handles the "3-way handshake" 108 between the host server 102 and the client server 106. The TCP session setup module may itself also incorporate modules for sending and receiving TCP session packets. These modules may include but are not limited to a session SYN packet receiver, a session SYN/ACK packet sender, and a session ACK packet receiver, which are all known to those of ordinary skill in the computer arts.

The TCP sessions setup module 104 may itself be embedded in one or more other host server modules (not shown). The TCP session setup module may alternatively comprise a hardware or firmware component. For example, the software which handles the TCP handshake 108 on behalf of the host server 102 may be programmed onto a externally programmable read-only memory ("EPROM") (not shown), and the EPROM may then be integrated into the host server. In another example, the ASIC or FPGA is integrated into the host server.

Figure 2:
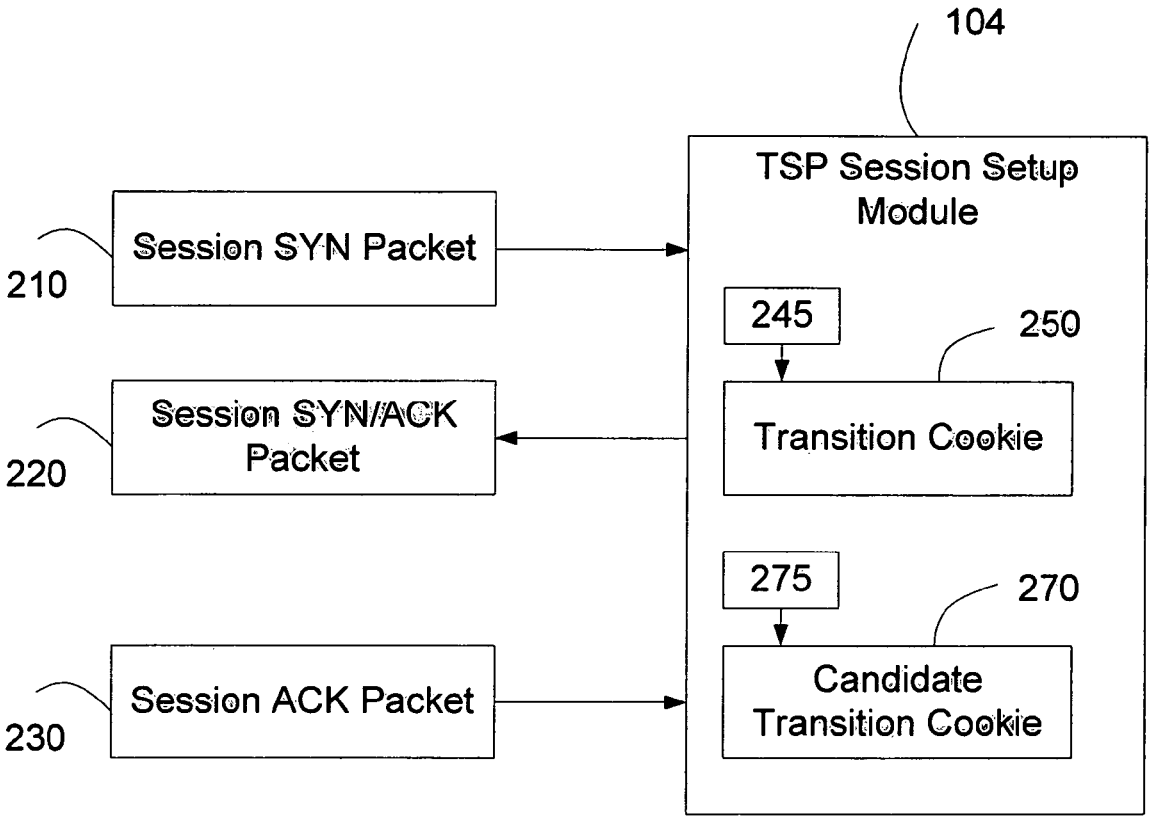
FIG. 2 is a schematic diagram of a TCP/IP handshake in accordance with an embodiment of the present invention.

FIG. 2 illustrates a TCP session setup module 104 processing TCP/IP segments (not shown), such as session SYN packet 210, session SYN/ACK packet 220, and session ACK packet 230.

A TCP/IP segment includes a TCP header and an IP header as described in IETF RFC 793 "Transmission Control Protocol" section 3.1 "Header Format", incorporated herein by reference. A TCP header optionally includes a sack-permitted option as described in IETF RFC 2018 "TCP Selective Acknowledgement Options" section 2 "Sack-Permitted Option", incorporated herein by reference. A session SYN packet 210 is a TCP/IP segment with the SYN control bit in the TCP Header set to "1". A session SYN/ACK packet 220 is a TCP/IP segment with the SYN control bit and the ACK control bit in the TCP header set to "1". A Session ACK Packet 230 is a TCP/IP segment with the ACK control bit in the TCP header set to "1".

Referring to FIG. 2, in an embodiment, the TCP session setup module 104 receives a session SYN packet 210, obtains data from a session SYN packet 210, such as but not limited to the source IP address of the IP header, or the sequence number of the TCP header, and uses the data to generate a transition cookie 250. The transition cookie 250 is preferably a 32-bit data element. In response to the session SYN packet 210, the TCP session setup module 104 creates and sends out a session SYN/ACK packet 220 in accordance with IETF RFC 793 "Transmission Control Protocol" section 3.4 "Establishing a connection", incorporated herein by reference. The TCP session setup module 104 preferably includes the transition cookie 250 as the sequence number of the TCP header in the session SYN/ACK packet 220.

After the TCP session setup module 104 has sent out the session SYN/ACK packet 220, it waits for receipt of a responding session ACK packet 230. In an embodiment, when a session SYN/ACK packet 230 is received, the TCP session setup module 104 generates a 32-bit candidate transition cookie 270 such that the sum of candidate transition cookie 270 and a value of "1" equal the acknowledgement number of the TCP header in the session ACK packet 230. For example, if the acknowledgement number is "41B4362A" in hexadecimal format the candidate transition cookie 270 is "41B43629" in hexadecimal format; the sum of "41B43629" and a value of "1" equals "41B4362A". In another example, if the acknowledgement number is "00A30000" in hexadecimal format the candidate transition cookie 270 is "00A2FFFF" in hexadecimal format; the sum of "00A2FFFF" and a value of "1" equals "00A30000". In another example, if the acknowledgement number is "00000000" in hexadecimal format the Candidate Transition Cookie 270 is "FFFFFFFF" in hexadecimal format; the sum of "FFFFFFFF" and a value of "1" equals "00000000", with the most significant bit carried beyond the 32-bit boundary. The TCP session setup module 104 may thus validate the candidate transition cookie 270 in this manner. If the TCP session setup module 104 determines that the candidate transition cookie 270 is thus valid, the session ACK packet 230 is also valid. In this case, the TCP session setup module 104 obtains data from the validated session ACK packet 230 and sends the data and information generated during the validation of candidate transition cookie 270 to a computing module (not shown) for further processing.

In order to generate and validate transition cookies 250, 270, the TCP session setup module 104 may include a transition cookie generator 245 and a transition cookie validator 275, respectively. Alternatively, the generation and validation may be performed directly by the TCP session setup module 104. In the descriptions herein, references to the TCP and transition cookie validator 275 are understood to include any of the alternative embodiments of these components.

A transition cookie generator 245 includes the functionality of generating a transition cookie based on the data obtained from a session SYN 210 packet received by the TCP session setup module 104.

A transition cookie validator 275 includes the functionality of validating a candidate transition cookie 270 generated based on data obtained from a session ACK packet 230 received by the TCP session setup module 104.

In exemplary operation, a transition cookie generator 245 is software or firmware that generates a transition cookie 250 based on data obtained from a session SYN packet 210 received by the TCP session setup module 104. An exemplary method for generating a transition cookie 250 by a transition cookie generator 245 includes multiple steps as illustrated in FIGS. 3a-3c.

Figure 3A:
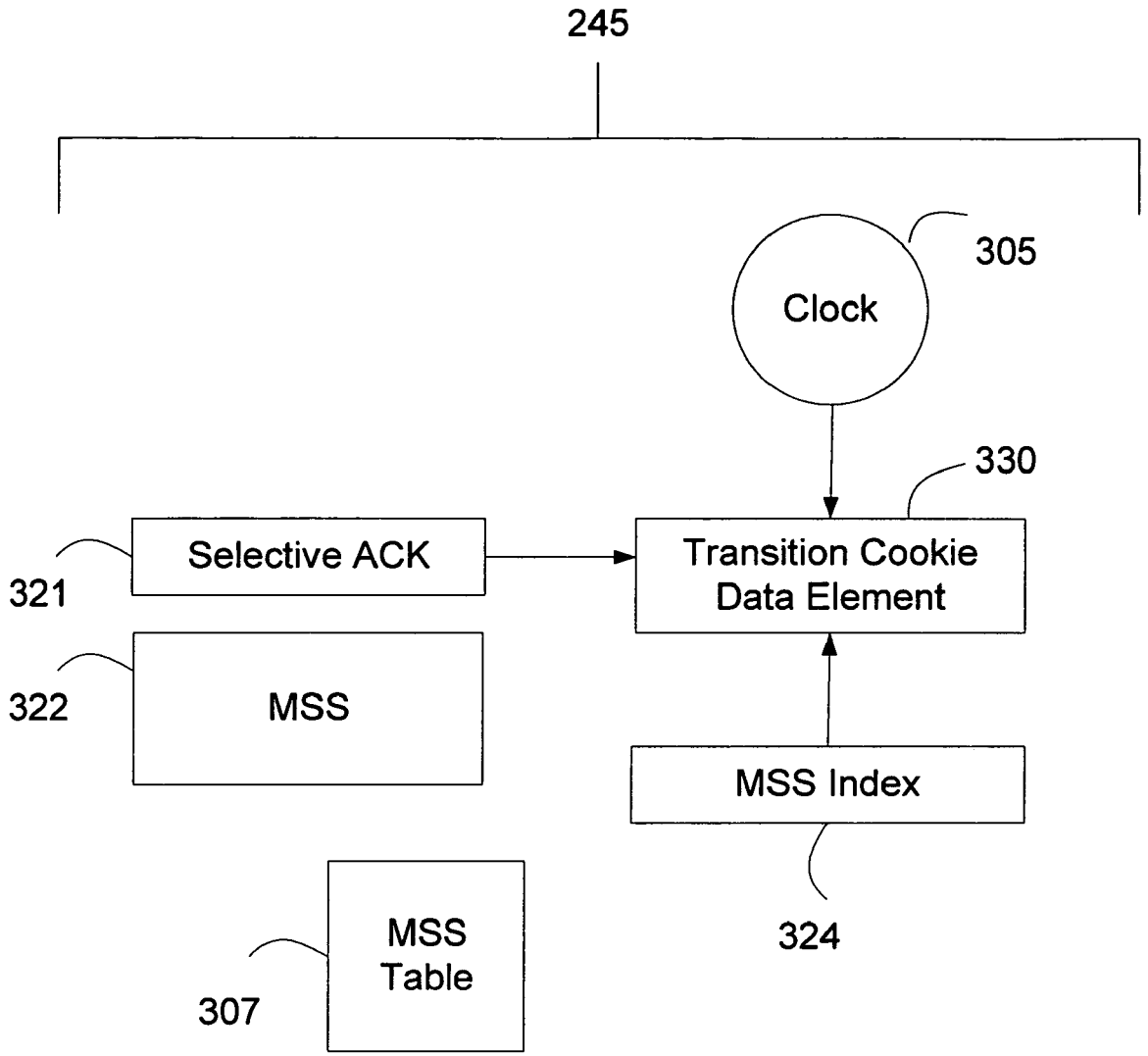
FIG. 3a illustrates a method including steps for generating a transition cookie data element by a transition cookie generator 245, in accordance with an embodiment of the present invention.
Figure 3B:
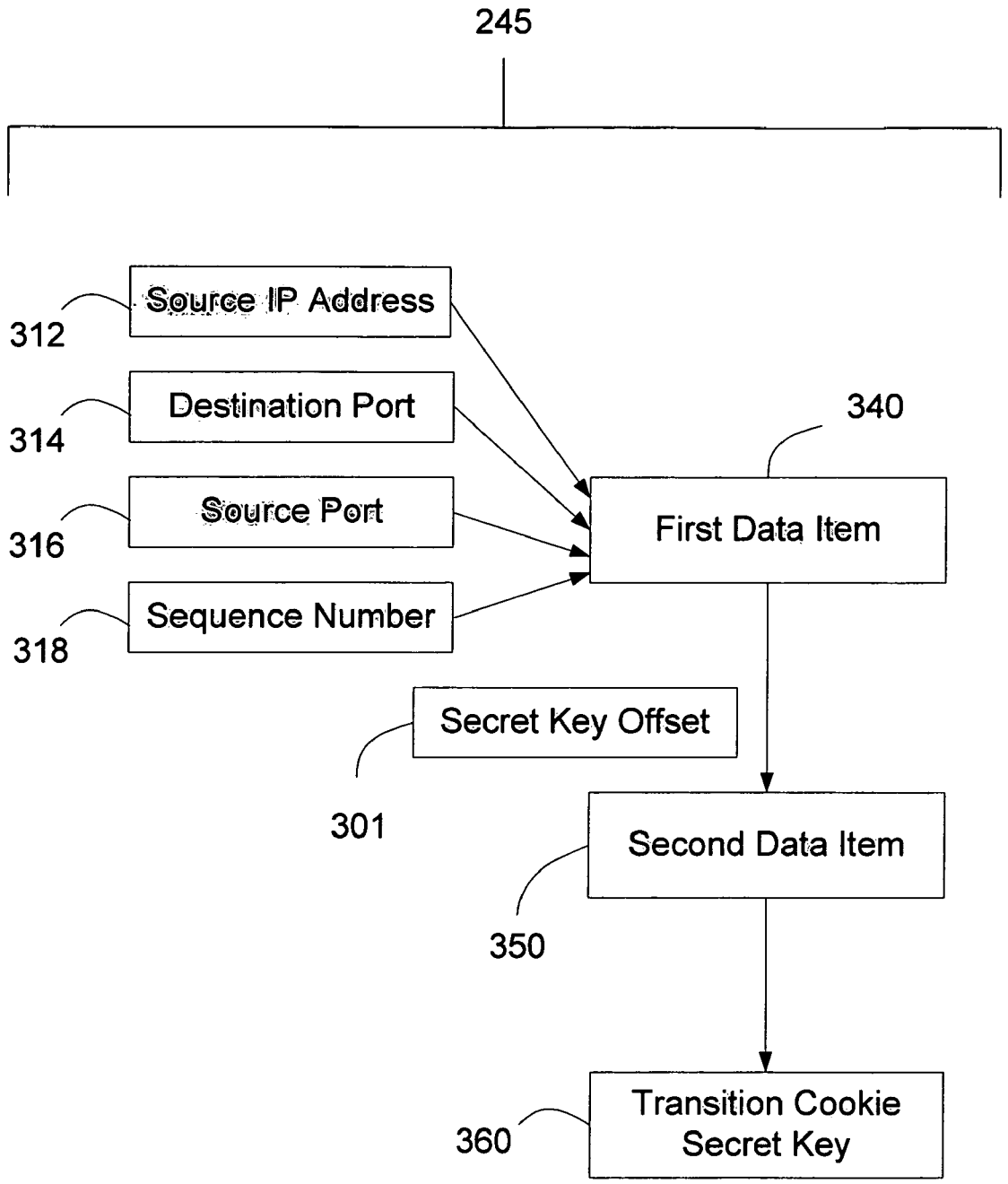
FIG. 3b illustrates a method including steps for generating a transition cookie secret key by a transition cookie generator 245 based on data obtained from the received session SYN packet, in accordance with an embodiment of the present invention.
Figure 3C:
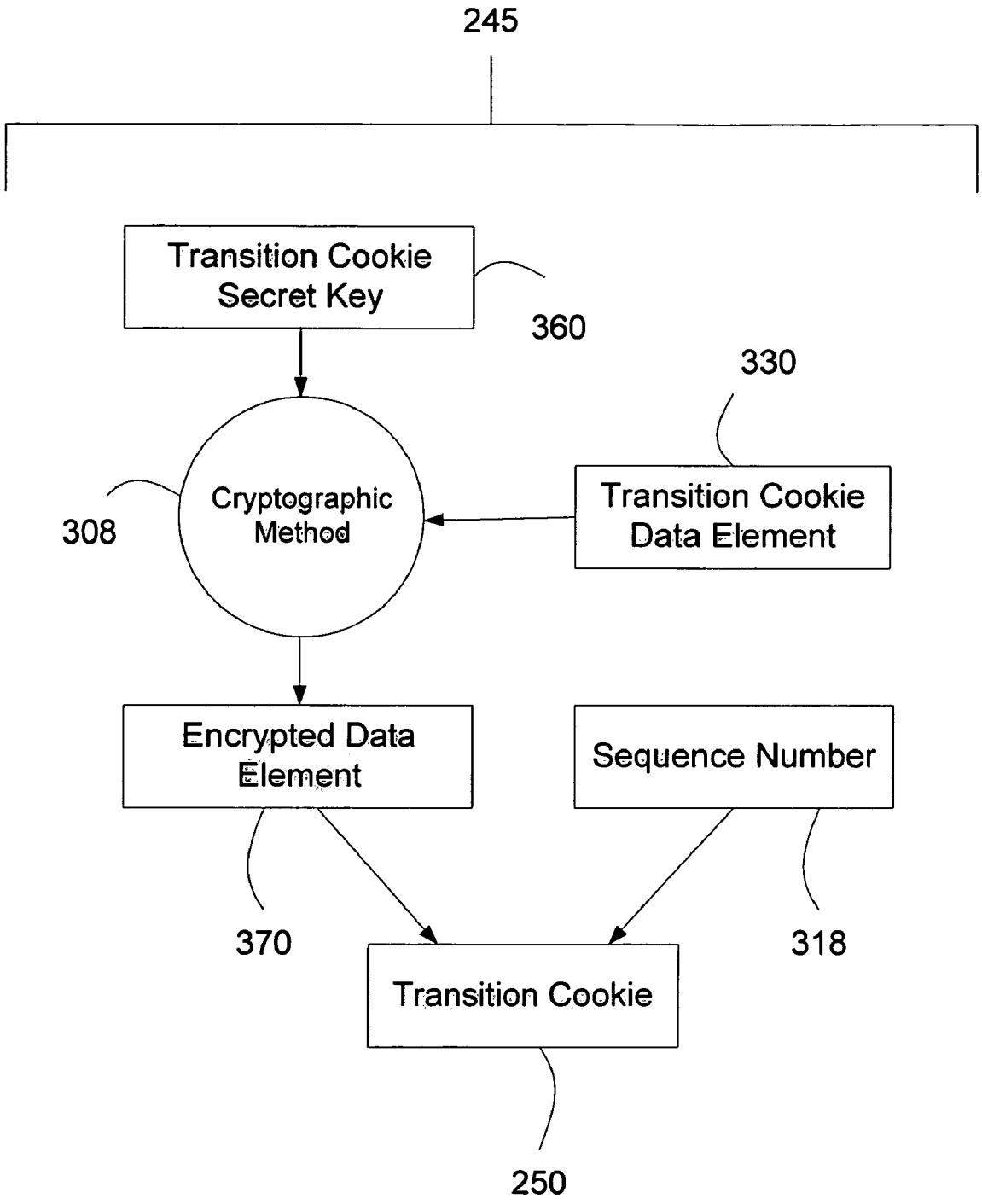
FIG. 3c illustrates a method including steps for generating a transition cookie based on a transition cookie data element, a transition cookie secret key, and data obtained from a received session SYN packet in accordance with an embodiment of the present invention.

FIG. 3a illustrates exemplary steps for generating a transition cookie data element 330 by a transition cookie generator 245. A transition cookie generator 245 includes a clock 305 indicating the current time of day in microseconds in a 32-bit format.

The transition cookie data element 330 is preferably a 32-bit data element, generated by the transition cookie generator 245 based on the selective ACK 321, the MSS index 324 and the 32-bit current time of day indicated by clock 305. Selective ACK 321 is a 1-bit data element which is set to a value of "1" by transition cookie generator 245 if a TCP header in a received session SYN packet 210 includes an optional sack-permitted option, or to "0" if a TCP header in a received session SYN packet 210 does not include an optional sack-permitted option.

Maximum Segment Size ("MSS") 322 is the maximum number of bytes that TCP will allow in an TCP/IP packet, such as session SYN packet 210, session SYN/ACK packet 220, and session ACK packet 230, and is normally represented by an integer value in a TCP packet header. If a TCP header in a received session SYN packet 210 includes a maximum segment size option, the transition cookie generator 245 sets the MSS 322 to equal the maximum segment size option data of the maximum segment size option. Otherwise, if the TCP header in a received session SYN packet 210 does not include a maximum segment size option, the transition cookie generator 245 sets the MSS 322 to a default value, for example, such as integer "536". The MSS index 324 is a 4-bit data element set by the transition cookie generator 245 based on the MSS 322. The transition cookie generator 245 preferably includes an MSS table 307, which maps an MSS 322 to an MSS index 324. The transition cookie generator 245 maps a MSS 322 with the MSS table 307 to set the value of MSS index 324. For example, MSS 322 has an integer value of "1460". After the mapping, MSS index 324 has a value of "4" as represented in hexadecimal format. In an alternative embodiment, means other than an MSS table 307 may be employed to determine the MSS index 324 value, such as the use of a mapping algorithm.

In generating a transition cookie data element 330, the transition cookie generator 245 sets a transition cookie data element 330 to equal the 32-bit current time of day indicated by clock 305. For example, the 32-bit current time of day may be "A68079E8" as represented in hexadecimal format, so the transition cookie data element 330 has a value of "A68079E8".

Next, the transition cookie generator 245 replaces the least significant 4 bits (bit 0-3) of transition cookie data element 330 with the MSS index 324, and replaces bit 4 of a transition cookie data element 330 with selective ACK 321. For example, if a transition cookie data element 330 has been set to a value of "A68079E8", selective ACK 321 has a value of "1", and MSS index 324 has a value of "4" as represented in hexadecimal format, after the replacements, transition cookie data element 330 has a value of "A68079F4" in hexadecimal format.

FIG. 3b illustrates exemplary steps for generating a transition cookie secret key 360, such as by a transition cookie generator 245 based on data obtained from a received session SYN packet 210. The data used in generating the transition cookie secret key 360 may include at least the source IP address 312 of an IP header, a destination port 314, a source port 316 and a sequence number 318 of a TCP header in a received session SYN packet 210. In generating a transition cookie secret key 360, a transition cookie generator 245 forms a 96-bit data element, a first data item 340, by concatenating a source IP address 312, a sequence number 318, a source port 316, and a destination port 314. For example, if the source IP address 312 is 192.168.1.134, the hexadecimal representation being "C0A80186", the sequence number 318 is "9A275B84", the source port 316 is 4761, the hexadecimal representation being "1299", and the destination port 314 is 240, the hexadecimal representation being "00F0", then, after the concatenation, the first data item 340 has a hexadecimal value of "C0A801869A275B84129900F0".

Next, since the transition cookie secret key 360 is a 128-bit data element, the transition cookie generator 245 may use a hash function to generate the transition cookie secret key 360 from the first data item 340. Further, the transition cookie generator 245 may use a secret key offset 301, which may be a 6-bit integer value, to select a 6-bit non-negative integer from first data item 340 starting at the bit indicated by secret key offset 301. For example, if the secret key offset 301 has a value of "12" and the first data item 340 has a hexadecimal value of "C0A801869A275B84129900F0", the transition cookie generator 245 selects a 6-bit non-negative integer from the first data item 340 starting at bit 12 (bit 12-17). The selected non-negative integer is of this example is thus "16". The transition cookie generator 245 then uses the selected non-negative integer to select 64 bits of data from the first data item 340, starting at the bit indicated by the selected non-negative integer, to generate the second data item 350, which has 64 bits.

For example, if the selected non-negative integer is "8" and the first data item 340 has a hexadecimal value of "C0A801869A275B84129900F0", the transition cookie generator 245 selects 64 bits (bit 8-71) of the first data item 340 to generate a second data item 350, having a hexadecimal value of "869A275B84129900". In another example, if the selected non-negative integer is "52", and the transition cookie generator 245 selects 64 bits (bit 52-95 and bit 0-19) of the first data item 340 in a wrap-around fashion, bits 52-95 have a hexadecimal value of "C0A801869A2", and bit 0-19 have a hexadecimal value of "900F0", so the generated second data item 350 has a hexadecimal value of "900F0C0A801869A2". The transition cookie generator 245 then generates a transition cookie secret key 360 by storing the second data item 350 in the least significant 64 bits (bit 0-63) of the transition cookie secret key 360 and setting the most significant 64 bits (bit 64-127) to "0". For example, if the second data item 350 has a hexadecimal value of "869A275B84129900", the transition cookie secret key 360 has a hexadecimal value of "0000000000000000869A275B84129900".

FIG. 3c illustrates exemplary steps for generating a transition cookie 250 based on a transition cookie data element 330, a transition cookie secret key 360, and data obtained from a received session SYN packet 210, including a sequence number 318 of a TCP header in a received session SYN packet 210. To generate a transition cookie 250, a transition cookie generator 245 applies a cryptographic method 308 on the transition cookie secret key 360 and the transition cookie data element 330, such as an RC5 algorithm described in IETF RFC 2040 "The RC5, RC5-CBC, RC5-CBC-Pad, and RC5-CTS Algorithms" section 1 "Overview", and sections 2-8 with detailed explanations, incorporated herein by reference. The RC5 algorithm takes a 32-bit plaintext input and a 128-bit encryption key to generate a 32-bit ciphertext output. The transition cookie generator 245 uses the transition cookie data element 330 as the plaintext input to the RC5 algorithm, and the transition cookie secret key 360 as the encryption key input to the RC5 algorithm. The transition cookie generator 245 stores the resulting 32-bit ciphertext output of the RC5 algorithm in the encrypted data element 370.

Next, the transition cookie generator 245 performs an unsigned binary addition on an encrypted data element 370 and the sequence number 318, and stores the result in the transition cookie 250. For example, if the encrypted data element 370 has a value of "0025BC83" in hexadecimal format, and the sequence number 318 has a value of "0743BD55" in hexadecimal format, the result of the addition is hexadecimal "076979D8". After the addition, the transition cookie 250 has a value of "076979D8" in hexadecimal. In another example, if the encrypted data element 370 has a value of "BE43D096" in hexadecimal format, and the sequence number 318 has a value of "9A275B84" in hexadecimal format, the result of the addition, and the value of transition cookie 250 is hexadecimal "1586B2C1A", with the most significant bit carried beyond the 32-bit boundary.

In another embodiment, a transition cookie generator 245 may use different steps to generate a transition cookie secret key 360. For example, a secret key offset 301 may be an integer of a different bit length, such as a 4-bit integer value, a 3-bit integer value, or a 5-bit integer value. Also, a transition cookie generator 245 may use a secret key offset 301 to select a non-negative integer value of a different bit length from a first data item 340. For example, a transition cookie generator 245 may select a 4-bit non-negative integer value, a 7-bit non-negative integer value, or a 5-bit non-negative value from a first data item 340.

In other embodiments, a transition cookie generator 245 may store a second data item 350 in the least significant 64 bits (bit 0-63) of a transition cookie secret key 360 or store second data item 350 in the most significant 64 bits (bit 64-127) of a transition cookie secret key 360.

A transition cookie generator 245 may also perform an exclusive-or operation on the most significant 48 bits (bit 0-47) of a first data item 340 and the least significant 48 bits (bit 48-95) of a first data element 340 to form a 48-bit temporary data element (not shown). Similarly, in another embodiment, a transition cookie generator 245 may perform an exclusive-or operation on the 48 even bits (bit 0, 2, 4, . . . 90, 92, 94) and the 48 odd bits (bit 1, 3, 5, . . . 93, 95, 97) to form a 48 bit temporary data element. In yet another embodiment, a transition cookie generator 245 may store a 48-bit temporary data element in the least significant 48 bits (bit 0-47) and the most significant 48 bits (bit 80-127) of a transition cookie secret key 360, and set bit 48-79 to "0", or store a 48-bit temporary data element in the least significant 48 bits (bit 0-47) of a transition cookie secret key 360, and set the most significant 80 bits (bit 48-127) of a transition cookie secret key 360 to "0".

In other embodiments of the invention, a transition cookie generator 245 may use an encryption algorithm to generate a transition cookie secret key 360 from the first data item 340.

In another embodiment, a transition cookie generator 245 includes a secret key and an encryption algorithm, and uses a first data element 340 as a plaintext input, and a secret key as an encryption key input to the encryption algorithm to generate a 128-bit ciphertext output. Next, a transition cookie generator 245 generates a transition cookie secret key 360 as a 128-bit ciphertext output. Alternatively, the ciphertext output may be a 96-bit data element, and a transition cookie generator 245 stores a 96-bit ciphertext output in the least significant 96 bits (bit 0-95) of a transition cookie secret key 360, and sets the most significant 32 bits (bit 96-127) to "0". In another alternative, a transition cookie generator 245 stores the least significant 32 bits (bit 0-31) of a 96-bit ciphertext output in the most significant 32 bits (bit 96-127) of a transition cookie secret key 360.

As seen in FIG. 2, a transition cookie validator 275 validates a candidate transition cookie 270 generated from a session ACK packet 230 received by the TCP session setup module 104. An exemplary method for validating a candidate transition cookie 270 by a transition cookie validator 275 may include multiple steps as illustrated in FIGS. 4a-4d.

Figure 4A:
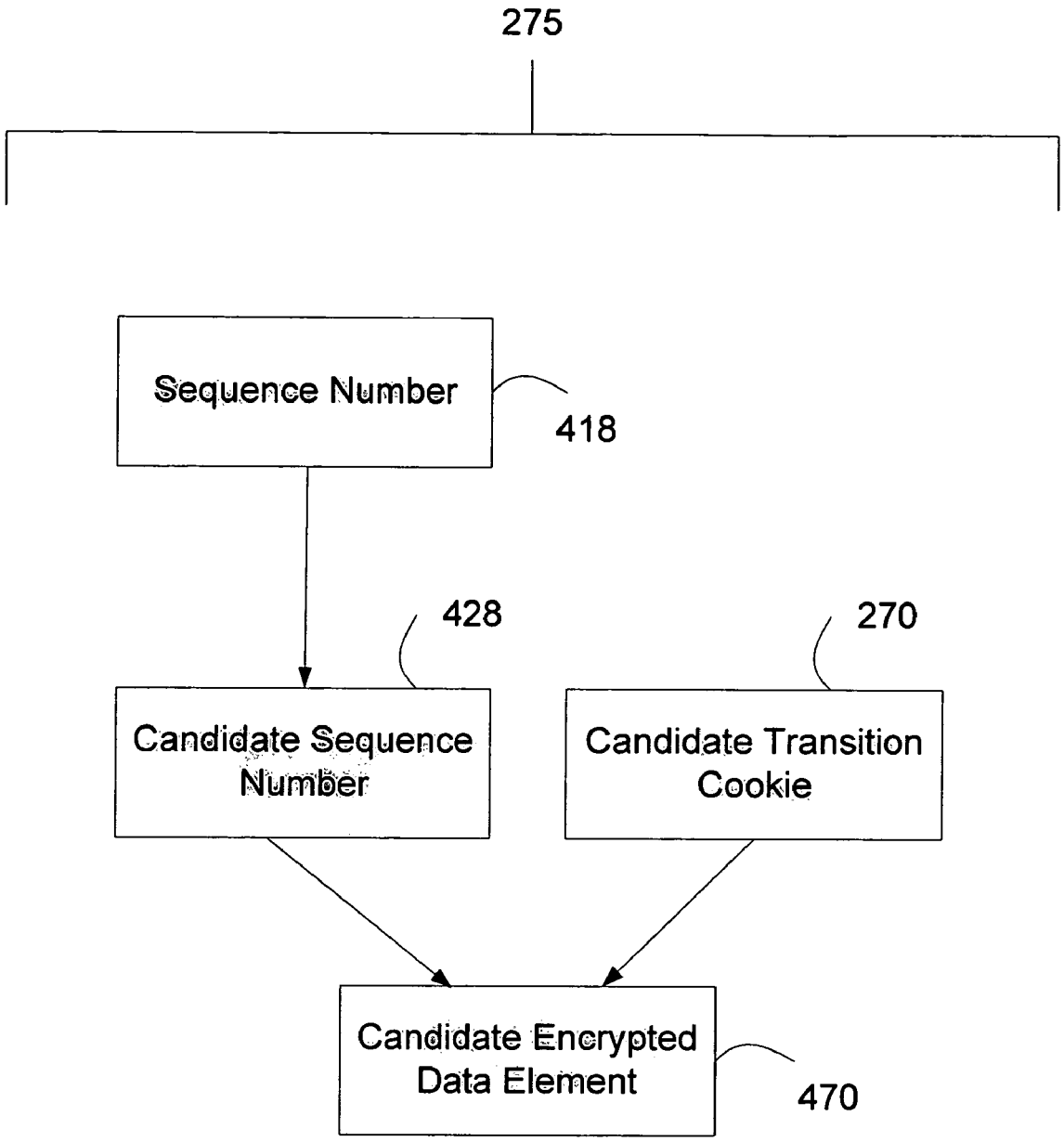
FIG. 4a illustrates steps for generating a candidate encrypted data element by a transition cookie validator 275 based on data obtained from a received session ACK packet, in accordance with an embodiment of the present invention.

FIG. 4a illustrates exemplary steps for generating a candidate encrypted data element 470 by a transition cookie validator 275 based on data obtained from a received session ACK packet 230. The candidate encrypted data element 470 may be a 32-bit data element generated based on the sequence number 418 of the TCP header in the received session ACK packet 230, and the candidate transition cookie 270 generated from the received session ACK packet 230 as illustrated in FIG. 2.

The candidate sequence number 428 may be a 32-bit data element generated by a transition cookie validator 275 such that the sum of candidate sequence number 428 and a value of "1" equals the sequence number 418.

The candidate encrypted data element 470 is generated by the transition cookie validator 275 such that the result of performing an unsigned binary addition of the candidate encrypted data element 470 and the candidate sequence number 428 equals the candidate transition cookie 270.

Figure 4B:
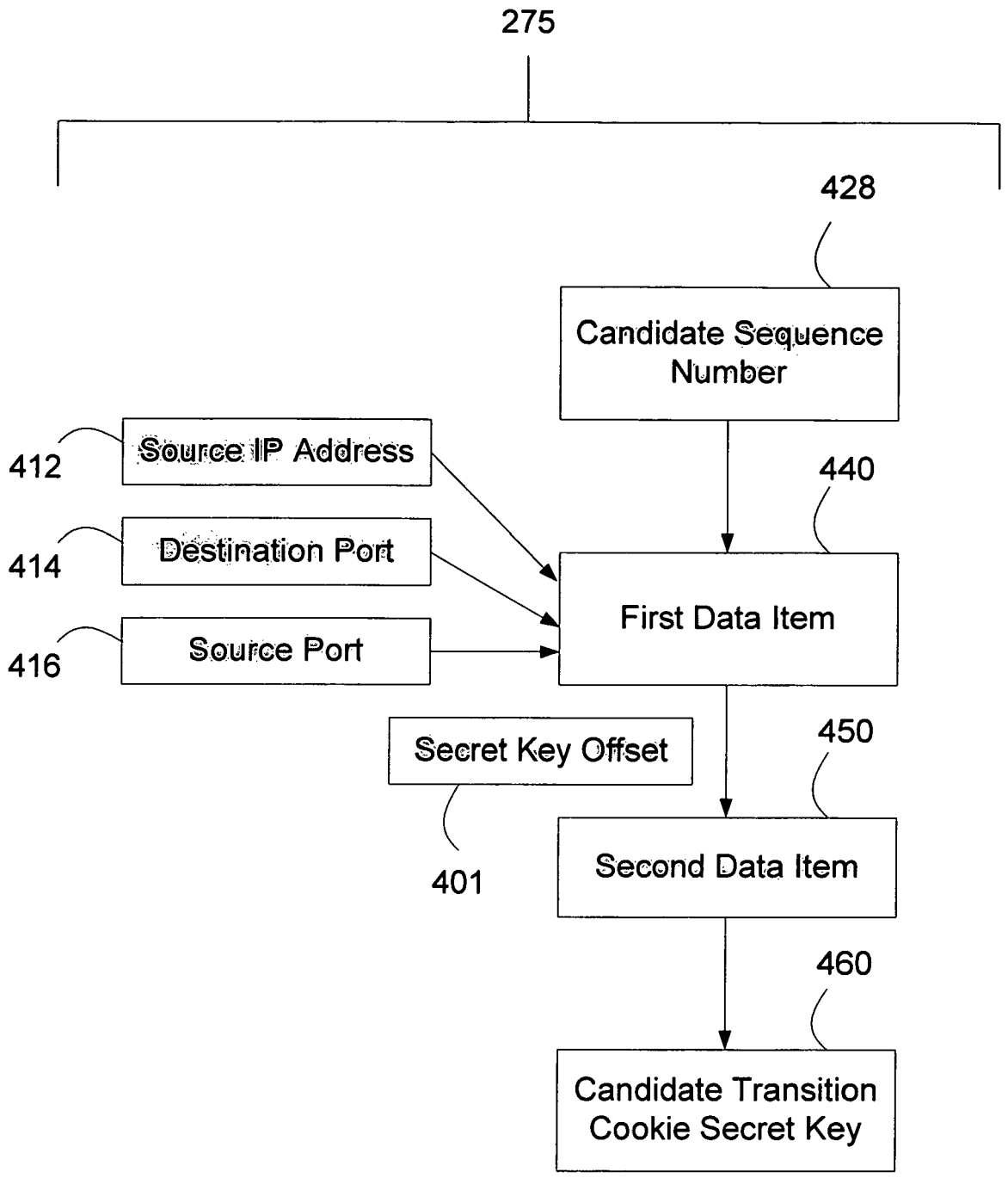
FIG. 4b illustrates a method including steps for generating a candidate transition cookie secret key by a transition cookie validator 275 based on data obtained from a received session ACK packet and a candidate sequence number, in accordance with an embodiment of the present invention.

FIG. 4b illustrates exemplary steps for generating a candidate transition cookie secret key 460 by the transition cookie validator 275 based on data obtained from the received session ACK packet 230 and a candidate sequence number 428. The data used for generating the candidate transition cookie secret key 460 may include at least a source IP address 412 of the IP header in a received session ACK packet 230, a destination port 414 and a source port 416 of the TCP header in a received session ACK packet 230. In the process, a 96-bit first data item 440 is formed by a transition cookie validator 275 by concatenating a source IP address 412, a candidate sequence number 428, a source port 416, and a destination port 414. For example, if the source IP address 412 is 192.168.1.134, having a hexadecimal representation of "C0A80186", the candidate sequence number 428 is hexadecimal "9A275B84", the source port 416 is 4761, having a hexadecimal representation of "1299", and the destination port 414 is 240, having a hexadecimal representation of "00F0", after the concatenation, the first data item 440 has a hexadecimal value of "C0A801869A275B84129900F0".

Next, the 128-bit candidate transition cookie secret key 460 is generated from a first data item 440 by a transition cookie validator 275 using a hash function. In an embodiment, a transition cookie validator 275 uses a 6-bit secret key offset 401 to select a 6-bit non-negative integer from a first data item 440 starting at a bit indicated by secret key offset 401. For example, if the secret key offset 401 has a value of "12" and the first data item 440 is "C0A801869A275B84129900F0", the transition cookie validator 275 selects a 6-bit non-negative integer from the first data item 440 starting at bit 12 (bits 12-17), selecting the non-negative integer "16". The transition cookie validator 275 then generates a 64-bit second data item 350 by using the selected non-negative integer to select 64 bits of data from the first data item 440, starting at the bit indicated by the selected non-negative integer.

For example, if the selected non-negative integer is "8" and the first data item 440 has a hexadecimal value of "C0A801869A275B84129900F0", the transition cookie validator 275 selects 64 bits (bit 8-71) of the first data item 440 to generate a second data item 450 having a hexadecimal value of "869A275B84129900". In another example, if the first data item 440 has a hexadecimal value of "C0A801869A275B84129900F0", and the selected non-negative integer is "52", the transition cookie validator 275 selects 64 bits (bit 52-95 and bit 0-19) in a wrap-around fashion. Bits 52-95 have a hexadecimal value of "C0A801869A2", and bits 0-19 have a hexadecimal value of "900F0", so the generated second data item 450 has a hexadecimal value of "900F0C0A801869A2".

Next, the transition cookie validator 275 generates a candidate transition cookie secret key 460 by storing the second data item 450 in the least significant 64 bits (bit 0-63) of the candidate transition cookie secret key 460 and setting the most significant 64 bits (bit 64-127) to "0". For example, if the second data item 450 has a hexadecinmal value of "869A275B84129900", the candidate transition cookie secret key 460 has a hexadecimal value of "0000000000000000869A275B84129900".

Figure 4C:
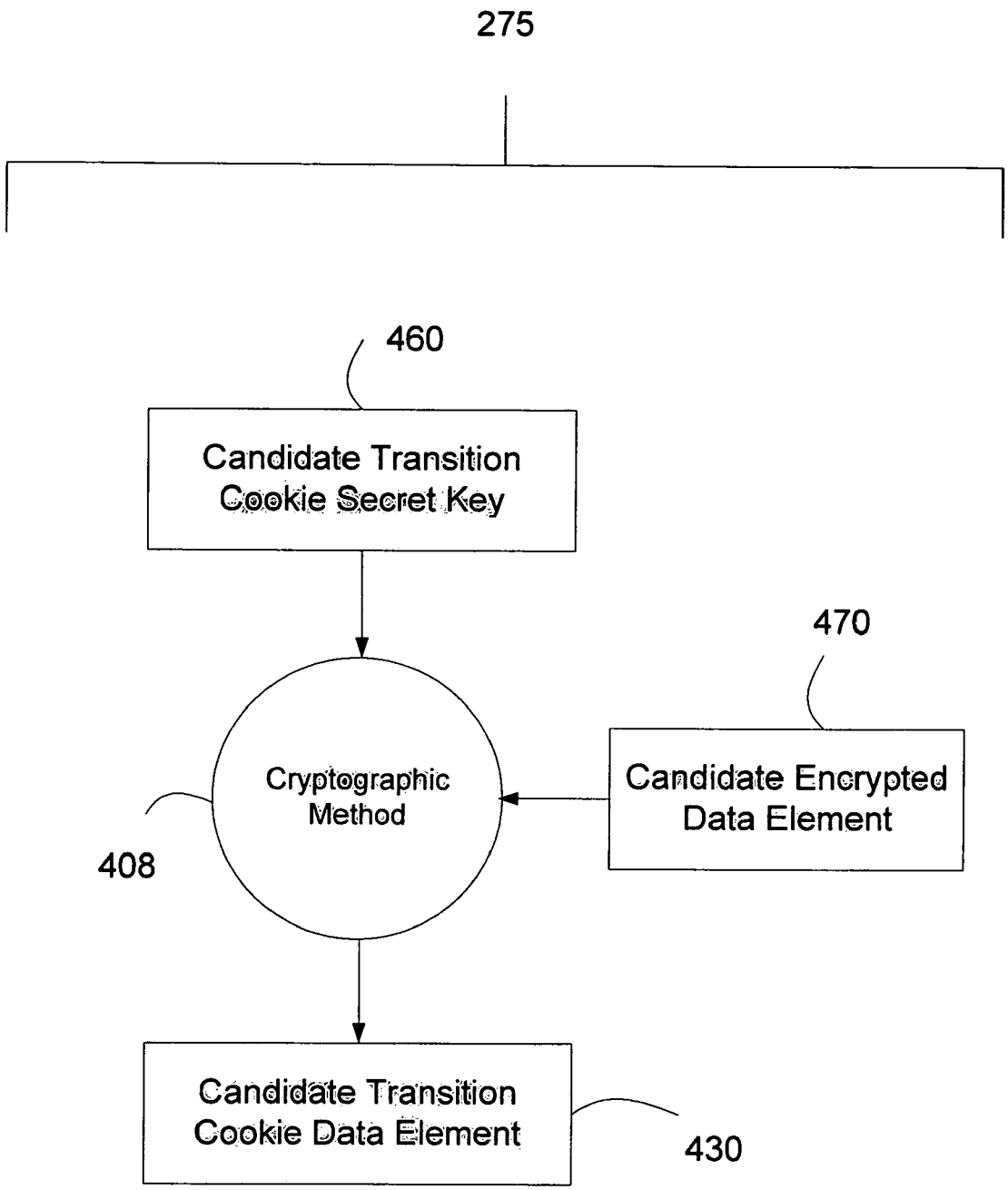
FIG. 4c illustrates a method including steps for generating a candidate transition cookie data element by a transition cookie validator 275 based on a candidate encrypted data element and a candidate transition cookie secret key, in accordance with an embodiment of the present invention.

FIG. 4C illustrates exemplary steps for generating a candidate transition cookie data element 430 by a transition cookie validator 275 based on a candidate encrypted data element 470 and a candidate transition cookie secret key 460.

In an embodiment, a transition cookie validator 275 applies a cryptographic method 408 on a candidate transition cookie secret key 460 and a candidate encrypted data element 470. An exemplary cryptographic method 408 is an RC5 algorithm described in IETF RFC 2040 "The RC5, RC5-CBC, RC5-CBC-Pad, and RC5-CTS Algorithms" section 1 "Overview", and sections 2-8 with detailed explanations, incorporated herein by reference. The RC5 algorithm takes a 32-bit ciphertext input and a 128-bit decryption key to generate a 32-bit plaintext output. A transition cookie validator 275 uses a candidate encrypted data element 470 as a ciphertext input to the RC5 algorithm, and a candidate transition cookie secret key 460 as a decryption key input to the RC5 algorithm, to generate a 32-bit candidate transition cookie data element 430 as the plaintext output of the RC5 decryption algorithm.

Figure 4D:
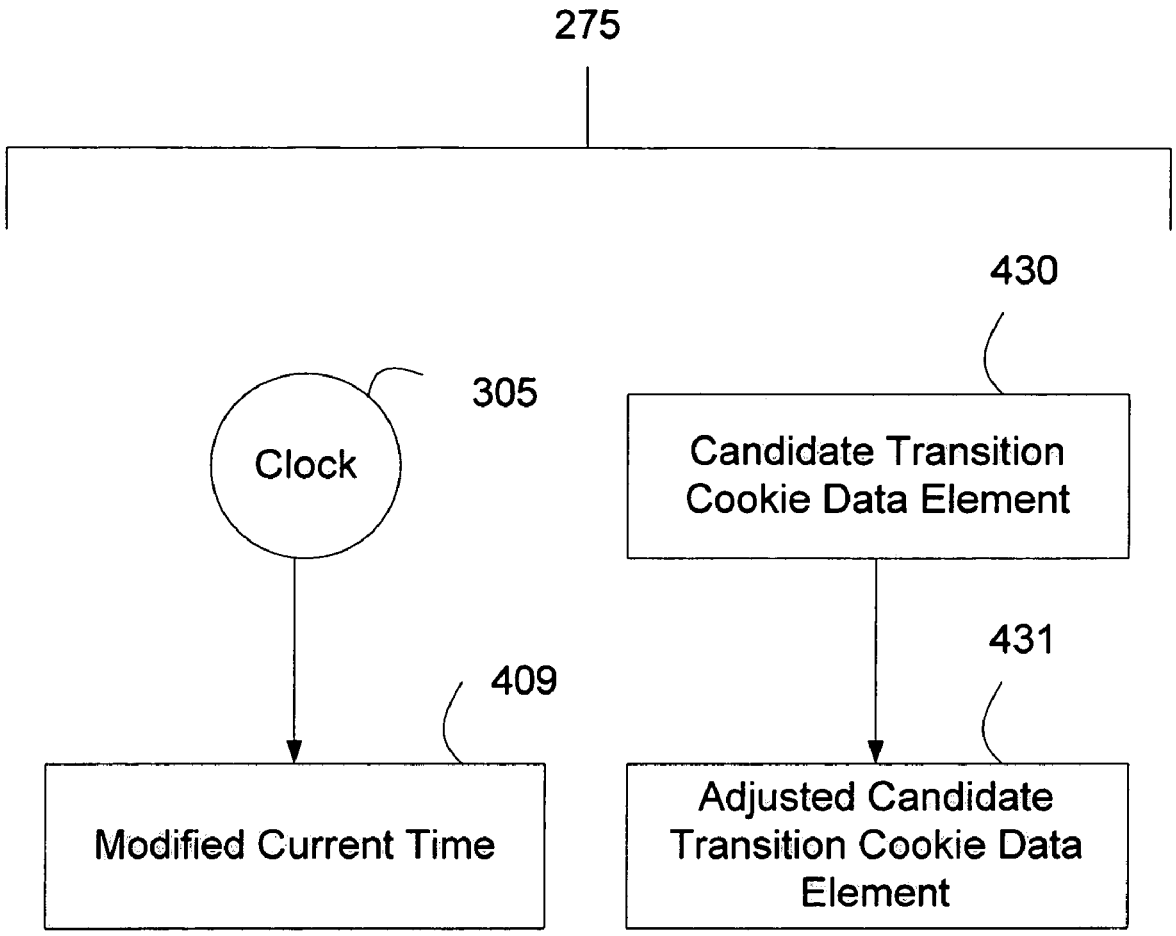
FIG. 4d illustrates a method including the steps for validating a candidate transition cookie data element, in accordance with an embodiment of the present invention.

FIG. 4d illustrates exemplary steps by a transition cookie validator 275 of validating a candidate transition cookie data element 430. In an embodiment, a transition cookie validator 275 includes a clock 305. The clock 305 indicates the current time of day, preferably in microseconds in a 32-bit format. The modified current time 409 is a 32-bit data element set by a transition cookie validator 275 sets to the current time indicated by clock 305. A transition cookie validator 275 then sets the least significant 5 bits (bit 0-4) of the modified current time 409 to "0". For example, if the modified current time 409 has a value of "89AE03F6" in hexadecimal format, after setting the least significant 5 bits to "0", the modified current time 409 has a hexadecimal value of "89AE03E0".

Next, a transition cookie validator 275 sets a 32-bit adjusted candidate transition cookie data element 431 to equal the candidate transition cookie data element 430, and then sets the least significant 5 bits (bit 0-4) of the adjusted candidate transition cookie data element 431 to "0". For example, if the adjusted candidate transition cookie data element 431 has a hexadecimal value of "89DB468F", after setting the least significant 5 bits to "0", the adjusted candidate transition cookie data element 431 has a hexadecimal value of "89DB4680".

The transition cookie validator 275 may then determine if the candidate transition cookie data element 430 is valid by determining if the adjusted candidate transition cookie data element 431 is within a time margin of 3 seconds of the modified current time 409. In an embodiment, in order to determine if the adjusted candidate transition cookie data element 431 is within a time margin of 3 seconds of the modified current time 409, the transition cookie stores the modified current time 409 in the least significant 32 bits (bit 0-31) of a first 33-bit time data element, sets the most significant bit (bit 32) to "0", and adds 6 seconds to the first 33-bit time data element. Adding 6 seconds is to add 6,000,000 micro seconds as represented by "5B8D80" in hexadecimal format. For example, if before the addition, the first 33-bit time data element has a hexadecimal value of "0FFFFFAE2", After the addition of "5B8D80", the first 33-bit time data element has a hexadecimal value of "1005B8862". The transition cookie validator 275 stores the adjusted candidate transition cookie data element 431 in the least significant 32 bits (bit 0-31) of a second 33-bit time data element, sets the most significant bit (bit 32) to "0", and adds 3 seconds to the second 33-bit time data element. Adding 3 seconds is to add 3,000,000 micro seconds as represented by hexadecimal "2DC6C0". The transition cookie validator 275 stores the modified current time 409 in the least significant 32 bits (bit 0-31) of a third 33-bit time data element, and sets the most significant bit (bit 32) to "0". If the second 33-bit time data element is smaller than the first 33-bit time data element and the second 33-bit time data element is larger than the third 33-bit time data element, the transition cookie validator 275 determines that the adjusted candidate transition cookie data element 431 is within 3 seconds of the modified current time 409, and thus that the candidate transition cookie data element 430 is valid.

Figure 5:
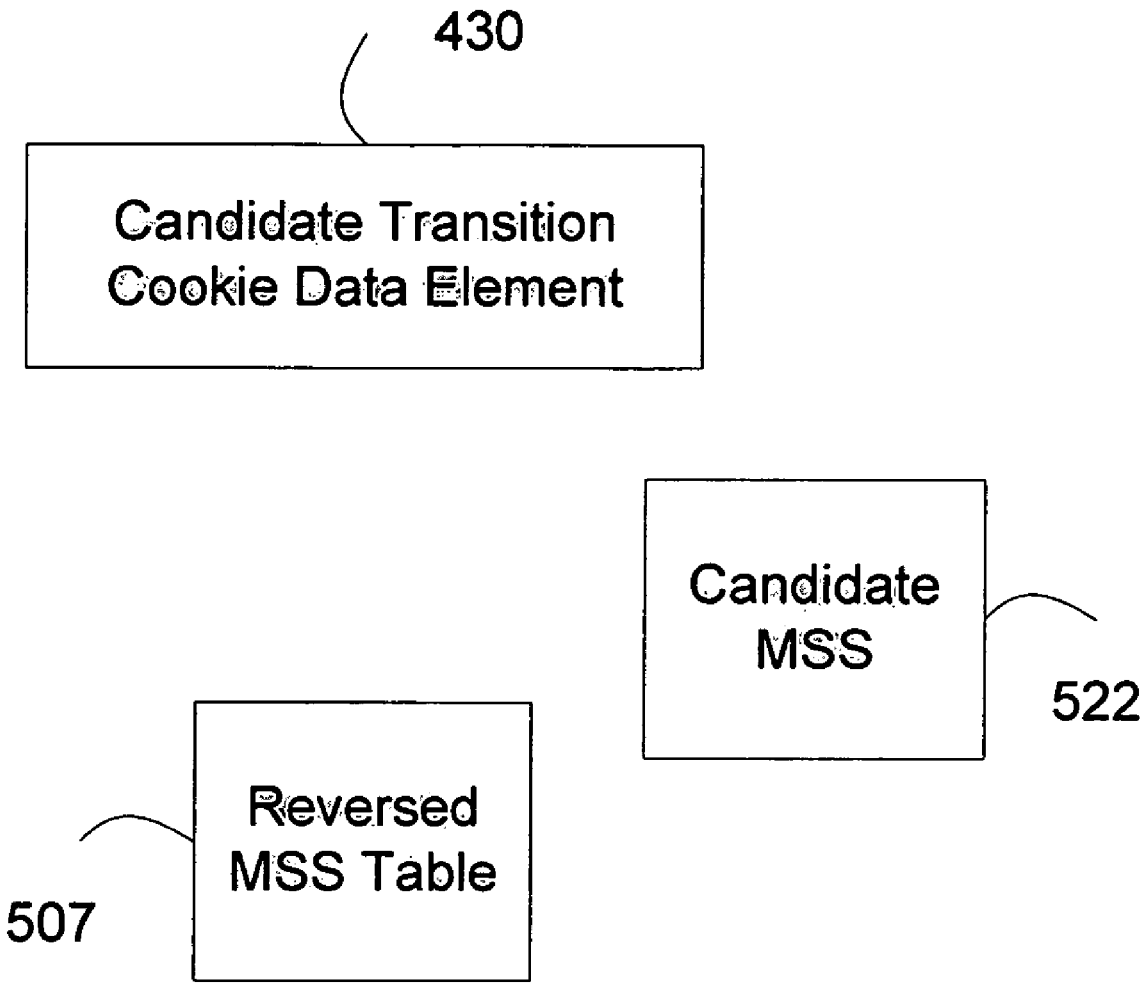
FIG. 5 illustrates a method including steps for generating information based on a validated candidate transition cookie data element, in accordance with an embodiment of the present invention.

FIG. 5 illustrates exemplary steps of generating information based on a validated candidate transition cookie data element 430. In an embodiment, candidate MSS 522 is an integer. A transition cookie validator 275 includes a reversed MSS table 507, which includes information that maps a 4-bit data element to a candidate MSS 522. A transition cookie validator 275 extracts the least significant 4-bit (bit 0-3) data from candidate transition cookie data element 430, maps the extracted 4-bit data to a reversed MSS table 507, and stores the result in a candidate MSS 522. A transition cookie validator 275 may then generate a maximum segment size option as described in IETF RFC 793 "Transmission Control Protocol" section 3.1 "Header Format", incorporated herein by reference, and sets a maximum segment size option data of the maximum segment size option to equal a candidate MSS 522. A transition cookie validator 275 may further examine bit 4 of a candidate transition cookie data element 430. If bit 4 of candidate transition cookie data element 430 has a value of "1", a transition cookie validator 275 may generate a sack-permitted option as described in IETF RFC 2018 "TCP Selective Acknowledgement Options" section 2, incorporated herein by reference. A TCP session setup module 104 may then send a sack-permitted option, a maximum segment size option, and data obtained from a received session ACK packet 230 to a computing module (not shown) for further processing.

There are many different encryption algorithms that use encryption keys of different bit lengths, such as, for example, 56-bit, 64-bit, 96-bit, 128-bit. These may generate ciphertext outputs of different bit lengths, for example, 96-bit, 64-bit, 128-bit, or 32-bit. Persons of ordinary skill in the cipher arts will be able to apply different methods, for example a hash function, to generate the transition cookie secret key 360 from the ciphertext output.

A transition cookie validator 275 may also use different steps to generate a candidate transition cookie secret key 460. The steps used by a transition cookie validator 275 to generate a candidate transition cookie secret key 460 are similar to the steps used by a transition cookie generator 245 to generate a transition cookie secret key 360.

Alternative embodiments of the invention may employ a different algorithm for the cryptographic methods 308, 408. In one example, the different algorithm is an RC2 algorithm described in IETF RFC 2268 "A Description of the RC2(r) Encryption Algorithm" section 1 "Introduction" and section 2-4 with detailed explanation, incorporated herein by reference. In another example, the different algorithm is a Blowfish algorithm. In one other example, the different algorithm is a Data Encryption Standards ("DES") algorithm based on Federal Information Processing Standards Publication "Data Encryption Standard (DES) FIPS PUB 46-3", which is incorporated herein by reference in its entirety. Other algorithms are also usable.

Also, a transition cookie validator 275 may use different time margins of modified current time 409 to determine if the candidate transition cookie data element is valid. Different time margins include but are not limited to 1 second, 4 seconds, 6 seconds, 2 seconds, or 11 seconds.

In an embodiment, the method of generating a transition cookie includes MD5 signature option information in the TCP options field. When this method is used, the method of validating a candidate transition cookie 270 correspondingly includes the MD5 signature option information in the TCP options field.

In another embodiment, transition cookie generator 245 may include a plurality of transition cookie generation methods for generating transition cookie 250. For example, the secret key offset 301 may have a different value, such as an integer value of different bit length, such as 4-bit, or 8-bit. In other examples, the selected non-negative integer from first data item 340 may be of different bit length, such as 8-bit, or 10-bit, the cryptographic method 308 may be a different algorithm than RC5, or the generating of transition cookie data element 330 may include MD5 signature option information in the TCP options field of session SYN packet 210. A transition cookie generation method may include steps different from the steps in the exemplary method illustrated in FIGS. 3a-3c.

In an embodiment, the transition cookie generator 245 may selects method to generate transition cookie 250 based on random data.

The random data may include time. In one embodiment, transition cookie generator 245 selects a method based on the time of day. Alternatively, the transition cookie generator 245 may select a method after a time period, such as 10 seconds, 30 seconds, 2 minutes or 3 hours.

In another embodiment, the random data may include a source IP address in session SYN packet 210, or a destination IP address in session SYN packet 210.

The random data may include the network interface at which a TCP session setup module 104 receives a session SYN packet 210, or a Virtual Local Area Network (VLAN) information associated with a session SYN packet 210.

In one embodiment, transition cookie validator 275 includes a plurality of transition cookie validation methods for validating candidate transition cookie 270. A transition cookie validation method may include steps different from the steps in the exemplary method illustrated in FIGS. 4a-4d. A transition cookie validator 275 may select a method to validate candidate transition cookie 270 based on random data.

In these embodiments it is understood to be preferred that the transition cookie validator 275 selects a complementary method to the method selected by transition cookie generator 245.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

[1. A system for TCP SYN cookie validation at a host server comprising:

a session SYN packet receiver for receiving a session SYN packet;

a transition cookie generator operating to generate a transition cookie with the use of a transition cookie secret key, the transition cookie comprising a time value representing the actual time, wherein the transition cookie generator generates the transition cookie secret key based on data obtained from the received session SYN packet, the data obtained from the SYN packet including at least one of a source IP address of an IP header, a destination port, a source port, and a sequence number of a TCP header in the received session SYN packet, wherein the transition cookie generator concatenates the obtained data from the session SYN packet to generate a first data item of the generator and the transition cookie generator uses a first hash function to generate the transition cookie secret key from the first data item of the generator;

a session SYN/ACK packet sender for sending the transition cookie in response to the received session SYN packet;

a session ACK packet receiver for receiving a session ACK packet, the session ACK packet including a candidate transition cookie; and a transition cookie validator, for determining whether the candidate transition cookie in the received session ACK packet comprises a time value representing a time within a predetermined time interval from the time the session ACK packet is received, wherein the transition cookie validator generates a candidate transition cookie secret key based on data obtained from the received session ACK packet, the data obtained from the ACK packet including at least one of a source IP address of the IP header, a destination port, and a source port, wherein the transition cookie validator concatenates the obtained data from the session ACK packet to generate a first data item of the validator and the transition cookie validator uses the first or another hash function to generate the candidate transition cookie secret key from the first data item of the validator, wherein at least one of:

the transition cookie generator uses a secret key offset to select one or more bits of data from the first data item of the generator in order to generate a second data item of the generator, and the transition cookie validator uses a candidate secret key offset to select one or more bits of data from the first data item of the validator in order to generate a second data item of the validator.]

[2. The system according to claim 1, in which the transition cookie validator determines that the received session ACK packet is valid if the candidate transition cookie in the received session ACK packet comprises a time value representing a time within a predetermined time interval from the time the session ACK packet is received.]

[3. The system according to claim 1, in which the predetermined time interval is in the range of one to six seconds.]

[4. The system according to claim 1, in which the predetermined time interval is three seconds.]

[5. The system according to claim 1, in which the generating of the transition cookie includes the use of random data.]

[6. The system according to claim 1, in which the generating of the transition cookie includes the use of data obtained from the session SYN packet.]

[7. A system for TCP SYN cookie validation at a host server comprising:

a session SYN packet receiver for receiving a session SYN packet;

a transition cookie generator operating to generate a transition cookie with the use of a transition cookie secret key, the transition cookie comprising a time value representing the actual time, wherein the transition cookie generator generates the transition cookie by (i) generating an encrypted data element of the generator by applying a cryptographic method on the transition cookie secret key and a transition cookie data element, (ii) performing an unsigned binary addition on the encrypted data element of the generator and a sequence number of a TCP header in the received session SYN packet, and (iii) storing the result in the transition cookie;

a session SYN/ACK packet sender for sending the transition cookie in response to the received session SYN packet;

a session ACK packet receiver for receiving a session ACK packet, the session ACK packet including a candidate transition cookie; and a transition cookie validator, for determining whether the candidate transition cookie in the received session ACK packet comprises a time value representing a time within a predetermined time interval from the time the session ACK packet is received.]

[8. The system according to claim 7, wherein the transition cookie data element comprises data based on at least one of: a selective ACK, an MSS index, and a 32-bit current time of day indicated by a clock.]

[9. A system for TCP SYN cookie validation at a host server comprising:

a session SYN packet receiver for receiving a session SYN packet;

a transition cookie generator operating to generate a transition cookie with the use of a transition cookie secret key, the transition cookie comprising a time value representing the actual time;

a session SYN/ACK packet sender for sending the transition cookie in response to the received session SYN packet;

a session ACK packet receiver for receiving a session ACK packet, the session ACK packet including a candidate transition cookie; and a transition cookie validator, for determining whether the candidate transition cookie in the received session ACK packet comprises a time value representing a time within a predetermined time interval from the time the session ACK packet is received, wherein the transition cookie validator generates:

a candidate sequence number such that a sequence number of a TCP header in the received session ACK packet equals the sum of the candidate sequence number and a value of 1, a candidate encrypted data element such that the result of performing an unsigned binary addition of the candidate encrypted data element and a candidate sequence number equals the candidate transition cookie, and a candidate transition cookie data element by applying a cryptographic method on a candidate transition cookie secret key and the candidate encrypted data element.]

[10. The system according to claim 9, wherein the transition cookie validator validates the candidate transition cookie data element by adjusting the candidate transition cookie data element to generate, and determining if the adjusted candidate transition cookie data element is within a predetermined time margin of a modified current time.]

*11. A system for TCP SYN cookie validation at a host server, the system comprising:*

*a session SYN packet receiver hardware configured to receive a session SYN packet;*

*a transition cookie generator hardware configured to generate a transition cookie using a transition cookie secret key, the transition cookie comprising a time value representing the actual time, wherein the transition cookie generator hardware generates the transition cookie secret key based on data obtained from the received session SYN packet, wherein the transition cookie generator hardware generates the transition cookie secret key by:*

*(i) generating an encrypted data element of the transition cookie generator hardware by applying a cryptographic method on the transition cookie secret key and a transition cookie data element;*

*(ii) performing an unsigned binary addition on the encrypted data element of the transition cookie generator hardware and a sequence number of a TCP header in the session SYN packet to obtain a result; and*

*(iii) storing the result in the transition cookie;*

*a session SYN/ACK packet sender hardware configured to send the transition cookie in response to the received session SYN packet;*

*a session ACK packet receiver hardware configured to receive a session ACK packet including a candidate transition cookie; and*

*a transition cookie validator hardware configured to determine whether the candidate transition cookie in the received session ACK packet comprises a time value representing a time within a predetermined time interval from the time the session ACK packet is received, wherein the transition cookie validator hardware generates a candidate transition cookie secret key based on data obtained from the received session ACK packet.*

*12. The system of claim 11, wherein the data obtained from the session SYN packet includes at least one of a source IP address, a destination port, a source port, and a sequence number of a TCP header.*

*13. The system of claim 11, wherein the transition cookie secret key is generated by:*

*concatenating the data obtained from the session SYN packet;*

*forming a first secret key transition data item based on the concatenation; and*

*generating the transition cookie secret key from the first secret key transition data item.*

*14. The system of claim 13, wherein generating the transition cookie secret key from the first secret key transition data item comprises using a hash function.*

*15. The system of claim 13, wherein the transition cookie secret key is further generated by:*

*selecting one or more bits of data from the first secret key transition data item using a secret key offset;*

*forming a second secret key transition data item based on the selected one or more bits; and*

*generating the transition cookie secret key from the first secret key transition data item and the second secret key transition data item.*

*16. The system of claim 11, wherein the data obtained from the session ACK packet includes at least one of a source IP address, a destination port, and a source port.*

*17. The system of claim 11, wherein the candidate transition cookie secret key is generated by:*

*concatenating data obtained from the session ACK packet;*

*forming a secret key candidate data item based on the concatenation; and*

*generating the candidate transition cookie secret key from the secret key candidate data item of the validation.*

*18. The system of claim 17, wherein the candidate transition cookie secret key is further generated by using a hash function to generate the candidate transition cookie secret key from the first secret key candidate data item.*

*19. The system of claim 11, further comprising determining that the received session ACK packet is valid if the candidate transition cookie in the session ACK packet comprises the time value representing a time within a predetermined time interval from the time the session ACK packet is received.*

*20. The system of claim 19, wherein the predetermined time interval is between one and eleven seconds.*

*21. The system of claim 11, wherein the candidate transition cookie secret key is generated based on data obtained from the session ACK packet and a candidate sequence number.*

*22. A host for validating a TCP SYN cookie, comprising:*

*a memory device storing instructions; and*

*a processor that, when executing the instructions, configures the host to:*

*receive a session SYN packet;*

*generate a transition cookie using a transition cookie secret key, the transition cookie comprising a time value representing the actual time, the transition cookie secret key being generated based on data obtained from the session SYN packet, the transition cookie secret key being generated by:*

(i) *generating an encrypted data element by applying a cryptographic method on the transition cookie secret key and a transition cookie data element;*

(ii) *performing an unsigned binary addition on the encrypted data element and a sequence number of a TCP header in the session SYN packet to obtain a result; and*

(iii) *storing the result in the transition cookie;*

*send the transition cookie in response to the received session SYN packet;*

*receive a session ACK packet including a candidate transition cookie; and*

*determine whether the candidate transition cookie in the received session ACK packet comprises a time value representing a time within a predetermined time interval from the time the session ACK packet is received, wherein the processor generates a candidate transition cookie secret key based on data obtained from the received session ACK packet.*

*23. The host of claim 22, wherein the data obtained from the session SYN packet includes at least one of a source IP address, a destination port, a source port, and a sequence number of a TCP header.*

*24. The host of claim 22, wherein the transition cookie secret key is generated by:*

*concatenating the data obtained from the session SYN packet;*

*forming a first secret key transition data item based on the concatenation; and*

*generating the transition cookie secret key from the first secret key transition data item.*

*25. The host of claim 24, wherein the transition cookie secret key is further generated by:*

*selecting one or more bits of data from the first secret key transition data item using a secret key offset;*

*forming a second secret key transition data item based on the selected one or more bits; and*

*generating the transition cookie secret key from the first secret key transition data item and the second secret key transition data item.*

*26. The host of claim 22, wherein the data obtained from the session ACK packet includes at least one of a source IP address, a destination port, and a source port.*

*27. The host of claim 22, wherein the candidate transition cookie secret key is generated by:*

*concatenating data obtained from the session ACK packet;*

*forming a secret key candidate data item based on the concatenation; and*

*generating the candidate transition cookie secret key from the secret key candidate data item of the validation.*

*28. The host of claim 22, wherein the processor further configures the host to determine that the session ACK packet is valid if the candidate transition cookie in the session ACK packet comprises the time value representing a time within a predetermined time interval from the time the session ACK packet is received.*

*29. The host of claim 28, wherein the predetermined time interval is between one and eleven seconds.*

*30. The host of claim 22, wherein the candidate transition cookie secret key is generated based on data obtained from the session ACK packet and a candidate sequence number.*

*31. A non-transitory computer-readable medium storing instructions that, when executed, cause a computing device to perform a method for validating a TCP SYN cookie, the method comprising:*

*receiving a session SYN packet;*

*generating a transition cookie using a transition cookie secret key, the transition cookie comprising a time value representing the actual time, the transition cookie secret key being generated based on data obtained from the session SYN packet, the transition cookie secret key being generated by:*

(i) *generating an encrypted data element by applying a cryptographic method on the transition cookie secret key and a transition cookie data element;*

(ii) *performing an unsigned binary addition on the encrypted data element and a sequence number of a TCP header in the session SYN packet to obtain a result; and*

(iii) *storing the result in the transition cookie;*

*sending the transition cookie in response to the received session SYN packet;*

*receiving a session ACK packet including a candidate transition cookie; and*

*determining whether the candidate transition cookie in the received session ACK packet comprises a time value representing a time within a predetermined time interval from the time the session ACK packet is received, wherein a candidate transition cookie secret key is generated based on data obtained from the received session ACK packet.*

* * * * *